Oct. 5, 1954 G. W. MacCHEYNE 2,691,071

PARTY LINE STATION IDENTIFICATION DIAL MECHANISM

Filed Dec. 17, 1953 2 Sheets-Sheet 1

*INVENTOR.*
GEORGE W. MAC CHEYNE

*BY* Francis E. Blake

ATTORNEY

Oct. 5, 1954 G. W. MacCHEYNE 2,691,071
PARTY LINE STATION IDENTIFICATION DIAL MECHANISM
Filed Dec. 17, 1953 2 Sheets-Sheet 2
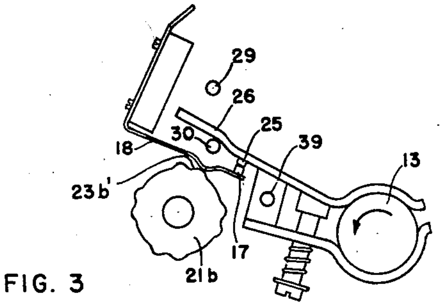
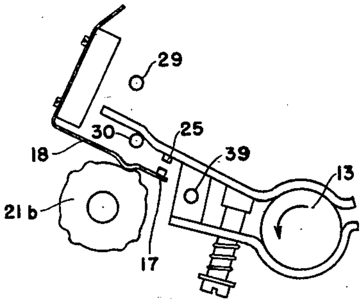
FIG. 4
FIG. 5
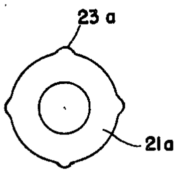
FIG. 6
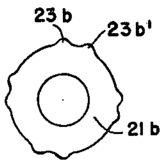
FIG. 7
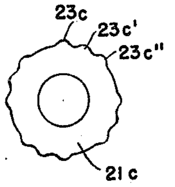
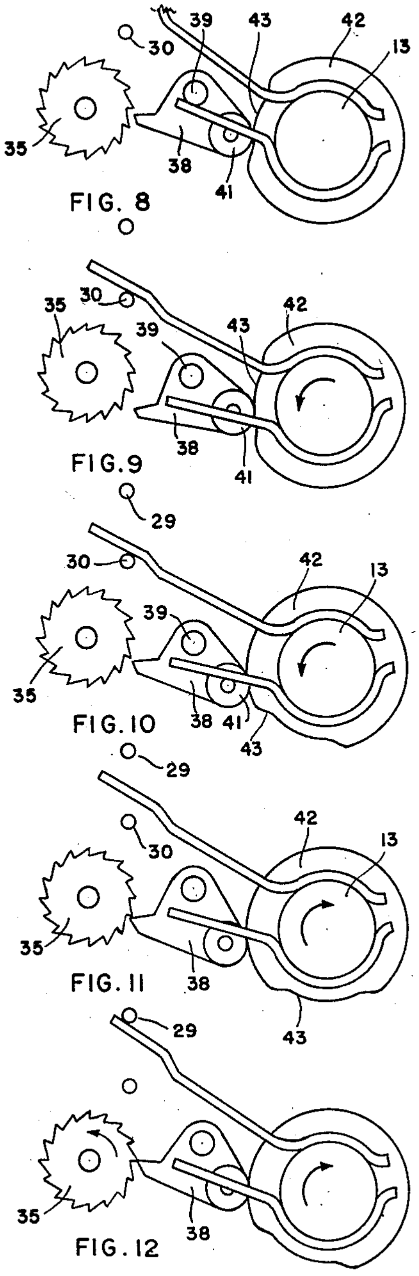
FIG. 8, FIG. 9, FIG. 10, FIG. 11, FIG. 12
INVENTOR.
GEORGE W. MAC CHEYNE
BY
Francis E. Blake
ATTORNEY Patented Oct. 5, 1954 2,691,071

UNITED STATES PATENT OFFICE 2,691,071

PARTY LINE STATION IDENTIFICATION DIAL MECHANISM

George W. MacCheyne, Webster, N. Y., assignor to Stromberg-Carlson Company, a corporation of New York Application December 17, 1953, Serial No. 398,682

5 Claims. (Cl. 179—90)

The present invention relates to automatic telephone systems and more particularly to a party line station identification dial mechanism.

Automatic telephone systems throughout the country are developing to the point where it is now possible for the customer to dial long distance toll calls between cities. Also, the growth of cities and their outlying suburbs to form large metropolitan areas served by a particular automatic telephone system is making it desirable to provide for the charging of toll rates depending upon the distance and length of time over which a call may be extended between various exchanges in the metropolitan system. Therefore, automatic toll ticketing arrangements have been developed for determining the charges to be made for different calls extended by customer dialing procedures.

When using automatic toll ticketing apparatus, the station extending the call must of course be identified to the automatic ticketing equipment. This is a relatively simple matter in the case of private lines, but in the case of party lines, some means to identify the particular call extending station on the party line must be provided.

There may be other applications in an automatic telephone system wherein it is desirable to automatically identify a particular party line station seeking to extend a call.

In the co-pending patent application of Frank A. Morris, Serial No. 393,107, filed November 19, 1953, and assigned to the same assignee as the present invention, a party line station identifying dial mechanism arranged to transmit a characteristic number of station identifying dial impulses during a plurality of successive setting movements of the dial mechanism is described. In a system using such dial mechanism, the particular station identification is made by a characteristic number of closures of station identifying contacts for a predetermined plural number of successive movements of the dial as required for transmitting the impulses of a predetermined plurality of successively dialed digits. In order to determine the aforesaid characteristic number of station identifying contact closures, the dial mechanism is provided with a so-called station identification cam which is operated in a predetermined manner each time the dial mechanism returns to the normal position after previously closing the identification contacts. As with conventional dials, the dial mechanism must always be rotated a predetermined minimum angular amount in order to assure the transmission of at least one digital impulse.

The principal object of the present invention is to provide an improved station identifying dial mechanism.

Another object of this invention is to provide a station identifying dial mechanism of the character described and arranged to transmit a characteristic number of station identifying impulses during a plurality of successive setting movements of the dial.

Another important object of the invention is to provide an improved station identifying dial mechanism that will not transmit the characteristic number of station identifying impulses unless the dial has been operated through a determined plurality of successive movements at least sufficient to transmit a similar determined plurality of successive sets of digital impulses.

Briefly described, the dial mechanism of the invention includes, in addition to the conventional dial impulsing contacts, a pair of station identification contacts arranged to be operated in a characteristic manner during each setting movement of the dial for a plurality of successively transmitted sets of digital impulses. One of the identification contacts is mounted on a first movable arm adapted to engage the periphery of a station identification cam having a characteristic plurality of cam lobes on its cam surface. The other station identification contact is mounted on a second arm frictionally secured to the dial shaft to be moved a limited amount as the dial shaft rotates in either direction. The arrangement is such that when the station identification contact on the first contact arm engaging a cam lobe is in an advanced position, and when the station identification contact on the second contact arm frictionally secured to the dial shaft is moved therewith towards the other station identification contact to an advanced position, a closure of the contacts will be established. In order to vary the characteristic occurrence of closures of the station identification contacts for successively different times when the dial shaft is rotated in the direction to set the dial mechanism, the identification cam is adapted to be rotated a predetermined amount during each movement of the dial shaft in the other direction, i. e., when the digital impulses are being transmitted upon the return movement of the dial mechanism to thereby register a different portion of the identification cam periphery with the first contact arm. This invention particularly features the provision of a pawl member pivotally secured to the second identification contact arm and normally positioned out of engagement with the periphery of a ratchet gear secured to the identification cam. A second control cam is secured to the dial shaft for rotation therewith and engages the pivotal pawl in a manner to pivot the pawl into engagement with the periphery of the identification cam ratchet gear only after the dial shaft has been rotated from the normal position the minimum angular amount necessary to assure the operation of the dial impulsing contacts upon the return of the dial. In this manner the characteristic rotation of the identification cam for predetermining the operations of the identification contacts for successive setting movements of the dial mechanism is prevented unless the dial mechanism has been moved in the setting direction sufficiently far to assure the transmission of digital impulses upon its return to the normal position.

Further objects and features of the present invention will be apparent with reference to the following detailed description taken in connection with the drawings in which Fig. 1 is a front face view of the dial mechanism of the invention;

Fig. 3 is a fragmentary detail of the station identification contact mechanism in the position with the contacts closed during the setting movement of the dial;

Fig. 4 is a view of the station identification contact mechanism in the position with the contacts open during another setting movement of the dial;

Fig. 5 is a detail of a station identification cam arranged to obtain one closure of station identification contacts during four successive setting movements of the dial for purposes of identifying party line station one, for example;

Fig. 6 is a view similar to Fig. 5 but showing a different station identification cam as required for party line station two;

Fig. 7 is a view similar to Fig. 6 but showing another station identification cam as may be used for party line station three, for example;

Fig. 8 is a fragmentary operational view of the ratchet and pawl for controlling the rotation of the station identification cam with the parts in the position assumed at the time that the dial mechanism is in the normal position;

Fig. 9 is a view similar to Fig. 8 but showing the parts in the position assumed at times when the dial shaft is being rotated in the direction to set the dial and before the dial shaft has been rotated the minimum angular amount required to assure transmission of at least one digital impulse during the return movement of the dial;

Fig. 10 is a view similar to Fig. 9 but showing the pivoted position of the pawl after the dial shaft has been rotated in the setting direction more than the aforesaid minimum angular amount;

Fig. 11 shows the pawl at the moment of engaging the ratchet gear of the identification cam as the dial shaft is rotated in the direction back toward normal for transmitting digital impulses, the position being that provided after the dial shaft has been rotated the aforesaid predetermined minimum angular amount in the setting direction;

Fig. 12 is a view similar to Fig. 11 and showing the position of the ratchet and pawl as the ratchet gear is being rotated to advance the station identification cam to the next identification position.

Figures 1, 2, 13:
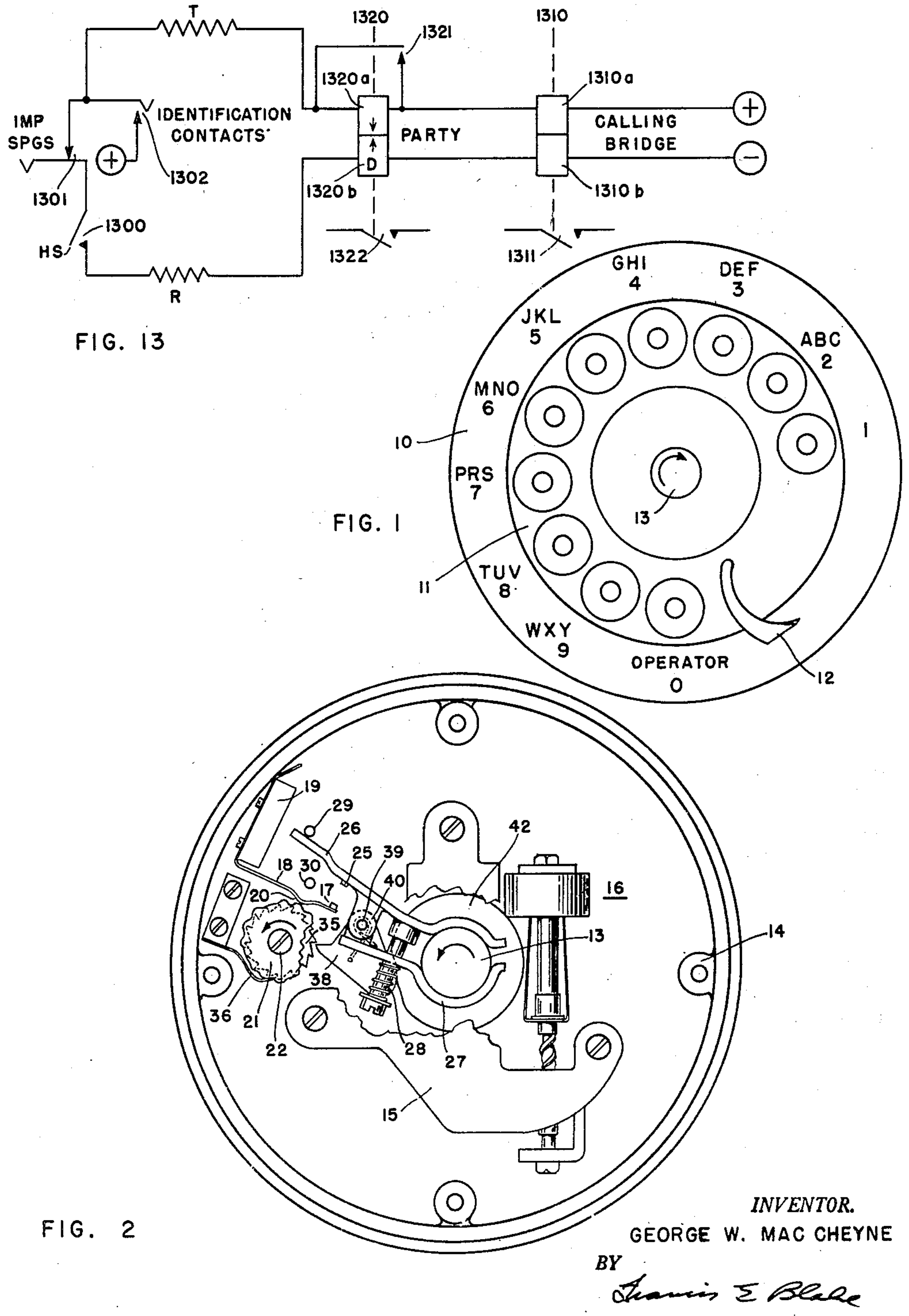
Fig. 2 is a rear face view of the dial mechanism partially cut away and showing in detail only the station identification contact mechanism.
Fig. 13 is a simplified schematic diagram of a trunk circuit arranged to respond to the characteristic operations of the station identification and dial impulsing contacts.

Referring first to Fig. 1 of the drawings, the station identification dial mechanism of the invention includes a stationary dial or number plate 10 and a rotatable dial 11 having the usual finger holes and dial identifications associated therewith. The dial plate 11 is rotatable in the first direction shown by the arrow until the operator's finger in any one of the dial holes engages the stop bar 12 to thereby set the dial mechanism. As shown in Fig. 2 of the drawings, which is a reverse view of Fig. 1, the dial shaft 13 will be rotated in a counterclockwise direction for each setting movement of the dial.

With further reference to Fig. 2, the dial plate 10 is secured to a main frame member 14 having a yoke member 15 mounted thereon on which the dial shaft 13 is rotatably supported. Conventional dial impulsing contacts, not shown in detail, are generally indicated at 16, and are also supported on a yoke 15 and the main frame member 14. As with conventional dials, the dial shaft 13 must be rotated a predetermined minimum amount in the setting or first direction to assure the transmission of at least one digital impulse as the dial returns to normal in the second direction. Spring means (not shown) is provided to return the dial to the normal position as is conventional. A first station identification contact 17 is mounted on a first movable spring arm 18 which is secured at 19 to the main frame 14. The relative advanced or retracted positions of the station identification contact 17 and arm 18 are determined by the engagement of the arm portion 20 with the peripheral cam surface of the generally circular station identification cam 21. The station identification cam 21 is secured to the shaft 22 which is rotatably mounted on the main dial frame 14, as shown.

Referring now to Figs. 5-7 of the drawings, each station identification cam 21 for a particular party line station may be provided with a characteristic cam formation indicative of a particular party line station. For example, Fig. 5 of the drawings shows a station identification cam 21*a* having one raised peripheral cam portion 23*a* in each quarter segment of its periphery for identifying station one in a party line system. As will be later described in detail, each station identification cam 21 is provided with mechanism for rotating the cam a predetermined angular amount for each successive setting movement of the dial mechanism so that the identification cam will have been rotated by a total angular amount of 90° in the illustrated embodiment during four successive setting movements of the dial as required to transmit four sets of digital impulses, i. e., 22½° during each of the four setting movements. As has been pointed out in detail in the co-pending application of Frank Morris, Serial No. 393,107, filed November 19, 1953, the exact proportioning of the angular movements of the station cam for a given predetermined plurality of the setting movements of the dial mechanism may be varied for any particular telephone system application and, as such, forms no part of the present invention. Fig. 6 shows a different form of identification cam 21*b* having two identification lobes 23*b* and 23*b'* in a given quarter segment of its periphery as may be required for identifying station two of a party line. Similarly, Fig. 7 shows yet another form of station identification cam 21c having three identification cam lobes 23c, 23c', and 23c'' as may be used for identifying station three. It should be apparent that a desired number of different party stations may be identified by using the required number of station identification cams each having a different characteristic number of cam lobes in a quarter segment of the cam periphery corresponding to 90° of cam rotation.

Referring again to Fig. 2 of the drawings, the second identification cam contact 25 is mounted upon a second contact arm 26 secured to the dial shaft 13 as by means of a frictional clamp including the clamping arm 27 and clamp tensioning spring, generally shown at 28. A stop pin 29 limits the movement of the contact arm 26 in one direction as the dial shaft 13 rotates in the direction to return the dial plate to normal and a similar stop member 30 limits the movement of the identification contact arm 26 in the other direction as the dial shaft 13 rotates in the direction of the arrow to set the dial mechanism.

As shown in Fig. 3 of the drawings, the identification contacts 17 and 25 will be closed into contact with each other at times when both the contact arms 18 and 26 are in their most advanced position, i. e., when the dial shaft 13 is rotating in the setting direction and the first contact arm 18 is engaging a lobe of one of the peripheral cams such as shown in 23b'. At other times, as shown in Fig. 4 of the drawings, the identification contacts 17 and 25 will not close contact with each other when the dial shaft 13 is rotating to the setting position and the contact arm 18 is resting on the periphery of the identification cam 21b at a point intermediate any of the identification cam lobes 23b or 23b'. Thus, in such manner, a characteristic number of closures of the identification contacts 17 and 25 will be obtained by a plurality of setting movements of the dial mechanism required for transmitting a plurality of successive sets of dial impulses as determined by the choice of a particular station identification cam such as shown in Figs. 5–7 of the drawings. As particularly shown in connection with Figs. 3 and 4 of the drawings, when using identification cam 21b, the identification contacts 17 and 25 will be closed only twice during the predetermined number, i. e., four of successive setting movements of the dial mechanism to thereby identify party line station two.

The above description of the station identification cam 21 and the identification contacts 17 and 25 assumes the rotation of the identification cam 21 a predetermined angular amount for each successive setting movement of the dial mechanism so that the total predetermined number, i. e., four, of successive setting movements will result in a total angular movement of the identification cam 21 through an arc sufficient to operate the identification contacts a sufficient number of times, in this case 90°. In order to obtain the desired rotation of the identification cam 21, the cam is provided with a ratchet gear 35 secured to its underside. The ratchet gear 35 is provided with ratchet teeth on its periphery and is prevented from reverse rotation by means of the spring locking arm 36 engaging a ratchet tooth, as shown in Fig. 2 of the drawings. In order to rotate the ratchet gear 35 together with the identification cam 21 in the direction shown by the arrow on Figs. 2 and 12, a pawl member 38 is pivotally secured at 39 to the second contact arm 26 for movement therewith. However, a coil spring 40 normally urges the pivoted pawl 38 to a position with the pawl heel portion 41 engaging the periphery of a control cam 42. The control cam 42 is secured to the dial shaft 13 for rotation therewith.

Reference may also be made to Figs. 8–12 in connection with this description of the arrangement and operation of the ratchet gear 35 and operating pawl 38. When the dial mechanism is in the normal or rest position, the pawl 38 assumes the position shown in Figs. 8 and 9 of the drawings with the pawl heel portion 41 engaging an indentation 43 of the control cam 42. It will be seen in Figs. 8 and 9 of the drawings that the pawl 38 cannot engage the periphery of the ratchet gear 35 so long as the pawl heel portion 41 is engaging the indented portion 43 of the control cam 42. The indentation 43 extends along a peripheral arc of the circular control cam 42 equivalent to the predetermined minimum angular rotation in the setting direction for the dial shaft 13 as required to assure the transmission of at least one digital impulse upon the return movement of the dial. As stated before, so long as the pawl 38 is in the position shown by either Figs. 8 or 9 of the drawings, movements of the contact arm 26 between the stops 29 and 30 for similarly moving the pawl 38, will not cause any movement of the ratchet gear 35 since the pawl 38 is pivoted on its pivot point 39 to a position not engaging the ratchet teeth.

As shown in Fig. 10, however, when the dial shaft 13 and control cam 42 have been rotated in the setting direction to an amount greater than the predetermined minimum amount required to assure transmission of at least one digital impulse, the heel portion 41 of the pawl 38 will ride out of the cam indentation 43 and will pivot the pawl about the pivot point 39 into a position to engage the teeth of the ratchet gear 35 when the contact arm 26 moves from the stop 30 towards the stop 29 as the dial and dial shaft rotate to return to normal. This movement of the pawl 38 into a position engaging the teeth of the ratchet gear 35 is shown in detail by Fig. 11 of the drawings with the parts in the position assumed as the control cam 42 and dial shaft 13 rotate in the direction of the arrow to return the dial to normal. Fig. 12 is a view similar to Fig. 11 but shows the actual engagement of the pawl 38 with the ratchet gear 35 for producing rotation of the ratchet gear in the direction of the arrow.

As described, it will be seen that the ratchet gear 35 and the identification cam 21 are rotated a predetermined angular amount for each operational movement of the dial mechanism by at least the predetermined minimum angular amount necessary to assure transmission of at least one digital impulse. If the dial mechanism is not moved the minimum angular amount, the ratchet gear 35 and identification cam 21 will not be rotated to the next identifying position. Since a characteristic operation of the identification contacts 17 and 25 is required during transmission of a determined plurality of successive sets of digital impulses, the correct identification of a party line station is prevented unless the dial mechanism has been properly operated the predetermined minimum amount required to transmit a set consisting of at least one digital impulse.

A simplified form of trunk circuit which may be used with the dial mechanism of the invention is shown in Fig. 13 of the drawings. As is conventional, the hook switch 1300 when closed establishes a loop circuit across tip conductor T and ring conductor R through the normally closed dial impulsing contacts 1301 to energize the calling bridge relay 1310 over its winding 1310*a* from the positive battery terminal and the winding 1310*b* to the negative battery terminal. The calling bridge relay pulsing contacts 1311 are connected to conventional telephone circuits (not shown). At this time the party relay 1320 does not operate since it is differentially energized with both windings 1320*a* and 1320*b* differentially wound. If the identification contact arm 18 is engaging an identification cam lobe, such as 23*b'* shown in Fig. 3 of the drawings, the identification contacts 17 and 25 of Fig. 3 and shown in Fig. 13 as contacts 1302 will be closed during the setting movement of the dial to connect the positive battery terminal to the tip conductor T which thereby shunts the upper winding 1320*a* of the differentially wound party relay 1320 causing its operation as should be readily understood. The operation of the party relay 1320 closes its contacts 1321 to lock the differential relay 1320 in the operated position until the loop circuit for the calling bridge relay 1310 is opened by the opening of the dial impulsing contacts 1301 during the return movement of the dial mechanism. Therefore, it will be understood that a characteristic operation of the party relay 1320 is obtained once for each time that the impulsing contacts 1302 are closed during each setting movement of the dial and this characteristic operation is determined by the characteristic formation of the party identification cam 21 as previously described. It should be understood that suitable identification circuits may be controlled through contacts 1322 of the party identification relay 1320. Since these circuits do not form a part of the present invention they are not described in detail herein.

The station identification dial mechanism of this invention may be used in various automatic telephone systems for purposes of identifying a partly line station by the characteristic operation of the station identification impulsing contacts. For example, the dial mechanism may be used in an automatic telephone system requiring at least four digital sets of impulses for establishing a connection between calling and called lines. Assuming the use of station identification cam layouts such as generally shown by Figs. 5-7 of the drawings, as many as five party stations on a party line may be identified by suitable choices of station identification cams for the respective party line stations. For example, station one would be identified by a dial mechanism using the station identification cam 21*a* of Fig. 5 of the drawings having only one peripheral cam portion 23*a* to be advanced into engagement with the identification contact arm during four successive setting movements of the dial mechanism. Similarly, station two would be identified by a dial mechanism employing an identification cam 21*b* having only two identification cam lobes 23*b* and 23*b'* to be advanced into engagement with the movable identification contact arm during four successive setting movements of the dial mechanism. As should be understood, station three would be identified by a cam having three identification lobes, while station four would be identified by a cam having four station identification lobes. Party line station five would be identified by an identification cam having no cam lobes in the cam section to be advanced into engagement with the identification contact arm during four successive setting movements of the dial mechanism. It should be understood that no particular order of occurrences of closure of the station identification contacts is required since the identification is established solely by the total number of closures of the identification contacts for a given plurality of successive setting movements of the dial mechanism such as in the example given, the four successive setting movements as required to transmit the digital impulses of four successive digits.

Referring again to the identification cam layout of Figs. 5-7 of the drawings, the invention has been particularly described with reference to an embodiment in which the characteristic number of cam lobes are equidistantly spaced along a peripheral arc corresponding to a quarter segment of the circular cam. In such an arrangement it should be apparent that the ratchet and pawl mechanism of the invention is designed to rotate the identification cam by an angular amount of 22½° for each movement of the dial mechanism in the setting direction, assuming the station identification to be established upon the transmission of the impulses of four successive digits. Obviously, the proportioning of the identification cam may vary within the spirit of the invention since, for example, the characteristic number of cam lobes may be equidistantly positioned along any given peripheral segment of the circular cam either larger or smaller than the 90° segment as specifically shown provided that the ratchet and pawl mechanism is correspondingly proportioned to rotate the identification cam by the required incremental amounts.

Various modifications of the station identifying means described and illustrated herein may be made. For example, I have shown station identification cams having four sets of cam lobes so that one complete rotation of the cam is effected after four separate calls have been made from a given substation. Thus if only one set of lobes is desired, it is possible to provide a ratchet arrangement for advancing the cam a full revolution during each call. The maximum permissible number of sets of lobes is, of course, determined by space limitations.

Another factor affecting the positioning of the cam lobes, the number of sets of lobes, and the contour of the control cam is the number of parties on a given line since many more lobes are required for an eight party line than for a four party line.

Various modifications may be made within the spirit of the invention and the scope of the appended claims.

What is claimed is:

1. In a calling device, a party line station identification dial mechanism including in combination, a frame, a dial shaft rotatably supported on said frame, a dial plate secured to said shaft for rotation therewith, said dial being rotatable a variable angular amount in one direction from a normal position to another position, means for rotating said dial in a second direction to return it from the other position to the normal position, a first set of impulsing contacts, means for operating said first set of contacts a variable number of times responsive to the degree of rotation of said dial in the second direction for producing a series of impulses corresponding to a dialed digit, a pair of station identification impulse producing contacts, a first contact arm movably mounted on said frame, a second contact arm frictionally secured to said dial shaft, means to limit the movement of said second contact arm to and from said first contact arm in response to rotations of said dial shaft in either direction, a respective one of said identification contacts being mounted on a respective one of said first and second contact arms to be moved with said arms into and out of engagement with each other, said second contact arm being movable towards said first contact arm to an advanced position as said dial and shaft are rotated in the first direction from the normal position, a cam plate rotatably supported on said frame and having a cam surface engaging the movable end of said first contact arm, means for rotating said cam plate a predetermined amount in response to each successive movement in the second direction by said dial shaft, said cam plate having a characteristic number of station identifying cam portions in a given length of cam surface corresponding to a predetermined amount of cam rotation as obtained by a predetermined number of successive rotations of said shaft in the second direction, said first contact arm when engaging the cam portions of said cam surface being moved towards said second contact arm to an advanced position, the relative positions of said contact arms being such as to close contact between said identification contacts only when said contact arms are both in the advanced positions toward each other whereby a characteristic number of closures of said identification contacts will be made responsive to a predetermined number of successive movements of said dial plate in the first direction to thereby identify the partly line station.

2. In a calling device, a party line station identification dial mechanism including in combination, a frame, a dial shaft rotatably supported on said frame, a dial plate secured to said shaft for rotation therewith, said dial being rotatable a variable angular amount in one direction from a normal position to another position, means for rotating said dial in a second direction to return it from the other position to the normal position, a first set of impulsing contacts, means for operating said first set of contacts a variable number of times responsive to the degree of rotation of said dial in the second direction for producing a series of impulses corresponding to a dialed digit, a pair of station identification impulse producing contacts, a first contact arm movably mounted on said frame, a second contact arm frictionally secured to said dial shaft, means to limit the movement of said second contact arm to and from said first contact arm in response to rotations of said dial shaft in either direction, a respective one of said identification contacts being mounted on a respective one of said first and second contact arms to be moved with said arms into and out of engagement with each other, said second contact arm being movable towards said first contact arm to an advanced position as said dial and shaft are rotated in the first direction from the normal position, a circular cam plate rotatably supported on said frame and having a peripheral cam surface engaging the movable end of said first contact arm, means for rotating said cam plate a predetermined amount in response to each successive movement in the second direction by said dial shaft, said cam plate having a characteristic number of station identifying cam portions in a given length of cam surface corresponding to a predetermined amount of cam rotation as obtained by a predetermined number of successive rotations of said shaft in the second direction, said first contact arm when engaging the cam portions of said cam surface being moved towards said second contact arm to an advanced position, the relative positions of said contact arms being such as to close contact between said identification contacts only when said contact arms are both in the advanced positions toward each other whereby a characteristic number of closures of said identification contacts will be made responsive to a predetermined number of successive movements of said dial plate in the first direction to thereby identify the party line station.

3. In a calling device, a party line station identification dial mechanism including in combination, a frame, a dial shaft rotatably supported on said frame, a dial plate secured to said shaft for rotation therewith, said dial being rotatable a variable angular amount in one direction from a normal position to another position, means for rotating said dial in a second direction to return it from the other position to the normal position, a first set of impulsing contacts, means for operating said first set of contacts a variable number of times responsive to the degree of rotation of said dial in the second direction for producing a series of impulses corresponding to a dialed digit, a pair of station identification impulse producing contacts, a first contact arm movably mounted on said frame, a second contact arm frictionally secured to said dial shaft, means to limit the movement of said second contact arm to and from said first contact arm in response to rotations of said dial shaft in either direction, a respective one of said identification contacts being mounted on a respective one of said first and second contact arms to be moved with said arms into and out of engagement with each other, said second contact arm being movable towards said first contact arm to an advanced position as said dial and shaft are rotated in the first direction from the normal position, a cam plate rotatably supported on said frame and having a cam surface engaging the movable end of said first contact arm, means for rotating said cam plate a predetermined amount in response to each successive movement only that is greater than a predetermined minimum angle of rotation in the second direction by said dial shaft as required to operate said impulsing contacts at least once, said cam plate having a characteristic number of station identifying cam portions in a given length of cam surface corresponding to a predetermined amount of cam rotation as obtained by a predetermined number of successive rotations of said shaft in the second direction, said first contact arm when engaging the cam portions of said cam surface being moved towards said second contact arm to an advanced position, the relative positions of said contact arms being such as to close contact between said identification contacts only when said contact arms are both in the advanced positions toward each other whereby a characteristic number of closures of said identification contacts will be made responsive to a predetermined number of successive movements of said dial plate in the first direction to thereby identify the party line station.

4. In a calling device, a party line station identification dial mechanism including in combination, a frame, a dial shaft rotatably supported on said frame, a dial plate secured to said shaft for rotation therewith, said dial being rotatable a variable angular amount in one direction from a normal position to another position, means for rotating said dial in a second direction to return it from the other position to the normal position, a first set of impulsing contacts, means for operating said first set of contacts a variable number of times responsive to the degree of rotation of said dial in the second direction for producing a series of impulses corresponding to a dialed digit, a pair of station identification impulse producing contacts, a first contact arm movably mounted on said frame, a second contact arm frictionally secured to said dial shaft, means to limit the movement of said second contact arm to and from said first contact arm in response to rotations of said dial shaft in either direction, a respective one of said identification contacts being mounted on a respective one of said first and second contact arms to be moved with said arms into and out of engagement with each other, said second contact arm being movable towards said first contact arm to an advanced position as said dial and shaft are rotated in the first direction from the normal position, a circular cam plate rotatably supported on said frame and having a peripheral cam surface engaging the movable end of said first contact arm, means for rotating said cam plate a predetermined amount in response to each successive movement only that is greater than a predetermined minimum angle of rotation in the second direction by said dial shaft as required to operate said impulsing contacts at least once, said cam plate having a characteristic number of station identifying cam portions in a given length of cam surface corresponding to a predetermined amount of cam rotation as obtained by a predetermined number of successive rotations of said shaft in the second direction, said first contact arm when engaging the cam portions of said cam surface being moved towards said second contact arm to an advanced position, the relative positions of said contact arms being such as to close contact between said identification contacts only when said contact arms are both in the advanced positions toward each other whereby a characteristic number of closures of said identification contacts will be made responsive to a predetermined number of successive movements of said dial plate in the first direction to thereby identify the party line station.

5. In a calling device, a party line station identification dial mechanism including in combination, a frame, a dial shaft rotatably supported on said frame, a dial plate secured to said shaft for rotation therewith, said dial being rotatable a variable angular amount in one direction from a normal position to another position, means for rotating said dial in a second direction to return it from the other position to the normal position, a first set of impulsing contacts, means for operating said first set of contacts at least once responsive to at least a predetermined degree of rotation of said dial from the normal position for producing impulses corresponding to a dialed digit, a pair of station identification impulse producing contacts, a first contact arm movably mounted on said frame, a second contact arm frictionally secured to said dial shaft, means to limit the movement of said second contact arm to and from said first contact arm in response to rotations of said dial shaft in either direction, a respective one of said identification contacts being mounted on a respective one of said first and second contact arms to be moved with said arms into and out of engagement with each other, said second contact arm being movable towards said first contact arm to an advanced position as said dial and shaft are rotated in the first direction from the normal position, a first circular cam plate rotatably supported on said frame and having a peripheral cam surface engaging the movable end of said first contact arm, a ratchet gear secured to said first cam plate, a pawl pivotally secured to said second contact arm, said pawl having a pointed end portion positioned in proximity to the periphery of said ratchet gear, said pawl having a heel portion opposite said pointed end portion, a second cam secured to said dial shaft for rotation therewith, means to urge said pivotal pawl to a position with said heel portion engaging a point on the periphery of said second cam, said second cam having an indented peripheral configuration along an arc of its periphery corresponding to said predetermined angle of rotation of said dial shaft from the normal position, the arrangement of said pawl and ratchet gear being such as to cause rotation of said ratchet gear and first cam plate a predetermined amount for each successive movement of said dial shaft in the second direction at times when the pointed end of said pawl is engaging said ratchet gear, and the relative positions of said ratchet gear and pawl being such as to prevent the engagement of the pointed end portion of said pawl with said ratchet gear until the heel portion of said pawl is engaging the periphery of said second cam at a point other than along the indented peripheral configuration whereby said first cam plate may not be rotated until said dial shaft has been rotated at least the predetermined angle of rotation from the normal position in the first direction, said first cam plate having a characteristic number of station identifying cam portions in a given length of cam surface corresponding to a predetermined amount of cam rotation as obtained by a predetermined number of successive rotations of said shaft in the second direction, said first contact arm when engaging the cam portions of said first cam plate being moved towards said second contact arm to an advanced position, the relative positions of said contact arms being such as to close contact between said identification contacts only when said contact arms are both in the advanced positions toward each other whereby a characteristic number of closures of said identification contacts will be made responsive to a predetermined number of successive movements of more than the predetermined angle of rotation of said dial plate in the first direction to thereby identify the party line station.

No references cited.